United States Patent
Wu et al.

(10) Patent No.: US 9,494,689 B2
(45) Date of Patent: Nov. 15, 2016

(54) MOBILE STATION LOCATING METHOD AND DEVICE AND LOCATION INFORMATION UPLOADING METHOD AND DEVICE FOR CLUSTER SYSTEM

(75) Inventors: Wally Wu, Harbin (CN); Pengfei Sun, Harbin (CN)

(73) Assignee: HARBIN HYTERA TECHNOLOGY CORP., LTD, Harbin (CN)

( * ) Notice: Subject to any disclaimer, the term of this patent is extended or adjusted under 35 U.S.C. 154(b) by 45 days.

(21) Appl. No.: 14/426,387

(22) PCT Filed: Jun. 7, 2012

(86) PCT No.: PCT/CN2012/076556
§ 371 (c)(1),
(2), (4) Date: Mar. 5, 2015

(87) PCT Pub. No.: WO2013/181817
PCT Pub. Date: Dec. 12, 2013

(65) Prior Publication Data
US 2015/0323674 A1    Nov. 12, 2015

(51) Int. Cl.
| | |
|---|---|
| *H04W 4/02* | (2009.01) |
| *G01S 19/03* | (2010.01) |
| *H04W 8/20* | (2009.01) |
| *G01S 5/02* | (2010.01) |
| *G01S 5/00* | (2006.01) |
| *H04W 64/00* | (2009.01) |

(52) U.S. Cl.
CPC ............. *G01S 19/03* (2013.01); *G01S 5/0027* (2013.01); *G01S 5/0205* (2013.01); *G01S 5/0294* (2013.01);
(Continued)

(58) Field of Classification Search
CPC ..... H04W 4/02; H04W 4/025; H04W 4/028; H04W 8/205; H04W 64/00; G01S 19/03; G01S 5/0027; G01S 5/0294
USPC ...................................................... 455/456.5
See application file for complete search history.

(56) References Cited

U.S. PATENT DOCUMENTS

2006/0003775 A1* 1/2006 Bull .................. G01S 5/0205
455/456.1
2006/0170588 A1   8/2006 Chang
(Continued)

FOREIGN PATENT DOCUMENTS

| CN | 1464668 A | 12/2003 |
|---|---|---|
| CN | 101478729 A | 7/2009 |

(Continued)

OTHER PUBLICATIONS

International Search Report and Written Opnion for PCT/CN2012/076556.
(Continued)

*Primary Examiner* — Nathan Taylor
(74) *Attorney, Agent, or Firm* — Kilpatrick Townsend & Stockton LLP (57) ABSTRACT

The present invention relates to the technical field of communications, and disclosed are a mobile station locating method and device for a cluster system. The method includes: through a control channel, activating a location information uploading function of a mobile station which needs location tracking; over a location tracking data service channel, sending a location information request message to the mobile station, the location tracking data service channel being a service channel with the same frequency as and a different time slot from the control channel; over the location tracking data service channel, receiving a location information response message sent by the mobile station, the location information about the mobile station being carried in the location information response message; and according to the location information about the mobile station, determining the current location of the mobile station.

16 Claims, 4 Drawing Sheets

(52) U.S. Cl.
CPC ............... *H04W 4/02* (2013.01); *H04W 4/025* (2013.01); *H04W 4/028* (2013.01); *H04W 8/205* (2013.01); *H04W 64/00* (2013.01)

(56) References Cited

U.S. PATENT DOCUMENTS

| | | | |
|---|---|---|---|
| 2008/0231499 A1* | 9/2008 | Kim | G01S 5/0036 342/146 |
| 2008/0298280 A1 | 12/2008 | Joshi et al. | |
| 2009/0312039 A1 | 12/2009 | Zou et al. | |
| 2014/0148135 A1* | 5/2014 | Haney | H04W 12/08 455/414.1 |

FOREIGN PATENT DOCUMENTS

| | | |
|---|---|---|
| CN | 101656912 A | 2/2010 |
| CN | 101662731 A | 3/2010 |
| CN | 101945344 A | 1/2011 |
| CN | 102457806 A | 5/2012 |
| WO | 01/19122 A1 | 3/2001 |
| WO | 0251190 A1 | 6/2002 |

OTHER PUBLICATIONS

The European search report issued on Mar. 9, 2016 regarding a European counterpart application (12878274.5).

* cited by examiner

MOBILE STATION LOCATING METHOD AND DEVICE AND LOCATION INFORMATION UPLOADING METHOD AND DEVICE FOR CLUSTER SYSTEM

The present application is a national phase of international application No. PCT/CN2012/076556, and the entire content of which is incorporated herein by reference.

FIELD

The present disclosure relates to the field of communication technique, and in particular to a method and a device for positioning a mobile station of a cluster system, and a method and a device for uploading location information of a mobile station of a cluster system.

BACKGROUND

Currently, GPS (Global Position System) has been widely applied in civil and professional fields. In addition to self-positioning by GPS, it is widely applied that GPS information is uploaded to a processing center via a wireless communication system so as to implement GIS (Global Information System).

Conventionally, GPS information is generally uploaded by data service of a public mobile communication network such as GPRS (General Packet Radio Service). However, in some special applications, it is unreliable to upload GPS information over the public mobile communications network due to problems such as resource guarantee, coverage of mobile signals of the public network in special areas and information security. Accordingly, GPS information is uploaded by a private network for many professional users having high demands.

A cluster system is a most representative technical system for private network communication technology. Currently, there are mainly two methods as follows for acquiring terminal location information for the cluster system.

1. A Manner of Control Channel Random Access

In this method, time interval for sending the GPS information is pre-configured for a mobile station which is to upload the GPS information. The mobile station sends the GPS information to the cluster system using a random access process at the configured time interval by way of short message or other dedicate control channel data service. Therefore, the GPS information of the mobile station is acquired by the cluster system.

This method is an ideal implementation in a case that the number of mobile stations belonging to one base station is small. However, in case of a larger number of mobile stations, there is generally a high probability that other service call is initiated over the control channel. Thus the control channel may be busy, and load of the control channel may be further increased due to the GPS information transmission service. Voice call service having a higher priority may be affected significantly, call connection speed may be reduced, and even a success rate for establishing a call may be affected. Moreover, since the GPS information is uploaded in a random access manner, there may be a certain percentage of call collision when the call is busy, and efficiency for uploading the GPS information is affected.

2. A Manner of a Dedicate Data Service Channel

In this method, multiple mobile stations are taken as a mobile station group, which sends data to the cluster system over the dedicate service data channel in a period of time in a manner of a service channel random access or according to a request from the cluster system. After the sending is completed, the mobile station group automatically returns to an idle state and monitors the control channel.

Compared with the manner of control channel random access according to the first method, the manner of the dedicate service data channel has some advantages in a case of a larger number of mobile stations and a relative rich service channel resource. However, in a case of a small number of mobile stations, utilization rate of the dedicate service data channel is low, and some calls to the mobile station group may fail.

SUMMARY

A method and a device for positioning a mobile station for a cluster system are provided according to an aspect of embodiments of the present disclosure, with which utilization rate of system resources and bearer capability are improved.

A method and a device for uploading location information of a mobile station for a cluster system are provided according to another aspect of embodiments of the present disclosure, with which efficiency for uploading the location information of the mobile station is improved and power consumption is reduced.

In view of the above, following technical solutions are provided according to embodiments of the present disclosure.

A method for positioning a mobile station for a cluster system is provided, which includes:

activating, over a control channel, a location information uploading function of a mobile station on which location tracking is to be performed;

sending, over a location tracking data service channel, a location information request message to the mobile station, where the location tracking data service channel is a service channel which has a same frequency as the control channel and a different time slot from the control channel; and receiving, over the location tracking data service channel, a location information reply message sent by the mobile station, where location information of the mobile station is carried in the location information reply message.

Preferably, activating, over the control channel, the location information uploading function of the mobile station on which location tracking is to be performed includes:

sending, over the control channel, a positioning service activating request message to the mobile station; and receiving, over the control channel, a positioning service activating response message sent by the mobile station, and determining that the location information uploading function of the mobile station is activated.

Preferably, information for indicating a time slot used by the location tracking data service channel is carried in the positioning service activating request message.

Alternatively, sending, over the control channel, the positioning service activating request message to the mobile station includes:

sending, over the control channel, the positioning service activating request message to the mobile station during registration of the mobile station; or sending, over the control channel, the positioning service activating request message to the mobile station when the mobile station is in an idle state.

Preferably, sending, over the control channel, the positioning service activating request message to the mobile station includes:

sending, over the control channel, the positioning service activating request message to the mobile station upon reception of a positioning service subscription request message sent by a positioning service subscriber, and the method further includes:

sending a positioning service subscription reply message to the positioning service subscriber upon reception of the activating response message sent by the mobile station;

sending a location information update message to the positioning service subscriber upon reception of the location information reply message sent by the mobile station, where the location information of the mobile station is carried in the location information update message so that the positioning service subscriber determines current location of the mobile station according to the location information of the mobile station;

sending, over the control channel, a positioning service deactivating request message to the mobile station upon reception of a positioning service subscription cancellation request message sent by the positioning service subscriber; and sending a positioning service subscription cancellation reply message to the positioning service subscriber upon reception of a positioning service deactivating response message sent by the mobile station and received over the control channel.

Preferably, the method further includes: setting a location information acquiring frequency for the mobile station;

and correspondingly, sending, over the location tracking data service channel, the location information request message to the mobile station includes:

sending, over the location tracking data service channel, the location information request message to the mobile station at the location information acquiring frequency.

A method for uploading location information of a mobile station for a cluster system is provided, which includes:

monitoring, by the mobile station, both a control channel and a location tracking data service channel in an idle state of the mobile station after a location information uploading function of the mobile station is activated, where the location tracking data service channel is a service channel which has a same frequency as the control channel and a different time slot from the control channel; and sending, over the location tracking data service channel, a location information reply message upon reception of a location information request message over the control channel, where the location information of the mobile station is carried in the location information reply message.

Preferably, the method further includes:

receiving, by the mobile station, a positioning service activating request message over the control channel; and enabling the location information uploading function and returning an activating response message.

Preferably, information for indicating a time slot used by the location tracking data service channel is carried in the positioning service activating request message; and the time slot indicated by the information is occupied by the location tracking data service channel.

Alternatively, receiving, by the mobile station, a positioning service activating request message over the control channel includes:

receiving the positioning service activating request message over the control channel during registration of the mobile station; or receiving the positioning service activating request message over the control channel when the mobile station is in the idle state.

Preferably, the method further includes:

receiving, by the mobile station, a positioning service deactivating request message over the control channel; and disabling the location information uploading function and returning a deactivating response message.

A base station of a cluster system includes:

an activating unit, configured to activate, over a control channel, a location information uploading function of a mobile station on which location tracking is to be performed;

a pull-up unit, configured to send a location information request message to the mobile station over a location tracking data service channel, where the location tracking data service channel is a service channel which has a same frequency as the control channel and a different time slot from the control channel; and an acquiring unit, configured to receive, over the location tracking data service channel, a location information reply message sent by the mobile station, where location information of the mobile station is carried in the location information reply message.

Preferably, the activating unit includes:

a request sub-unit, configured to send a positioning service activating request message to the mobile station over the control channel; and a response sub-unit, configured to receive, over the control channel, a positioning service activating response message sent by the mobile station and determine that the location information uploading function of the mobile station is activated.

Alternatively, the request sub-unit is configured to send the positioning service activating request message to the mobile station over the control channel during registration of the mobile station; or send the positioning service activating request message to the mobile station over the control channel when the mobile station is in an idle state.

Preferably, the base station further includes a subscription unit and a subscription response unit.

The subscription unit is configured to receive a positioning service subscription request message sent by a positioning service subscriber;

the request sub-unit is configured to send the positioning service activating request message to the mobile station over the control channel, after the positioning service subscription request message sent by the positioning service subscriber is received by the subscription unit;

the subscription response unit is configured to send a positioning service subscription reply message to the positioning service subscriber after the activating response message sent by the mobile station is received by the response sub-unit; and send a location information update message to the positioning service subscriber after a location information reply message sent by the mobile station is received by the acquiring unit, where the location information of the mobile station is carried in the location information update message so that the positioning service subscriber determines current location of the mobile station according to the location information of the mobile station;

the subscription unit is further configured to receive a positioning service subscription cancellation request message sent by the positioning service subscriber;

the request sub-unit is further configured to send a positioning service deactivating request message to the mobile station over the control channel, after the positioning service subscription cancellation request message sent by the positioning service subscriber is received by the subscription unit; and the subscription response unit is further configured to send a positioning service subscription cancellation reply message to the positioning service subscriber, after a positioning service deactivating response message sent by the mobile station is received by the response sub-unit.

Preferably, the pull-up unit is configured to send, over the location tracking data service channel, the location information request message to the mobile station at a location information acquiring frequency set for the mobile station.

A mobile station of a cluster system includes:

a monitoring unit, configured to monitor, in an idle state, both a control channel and a location tracking data service channel after a location information uploading function is activated, where the location tracking data service channel is a service channel which has a same frequency as the control channel and a different time slot from the control channel;

a first receiving unit, configured to receive a location information request message over the control channel; and an uploading unit, configured to send a location information reply message over the location tracking data service channel after the location information request message is received by the first receiving unit, where location information of the mobile station is carried in the location information reply message.

Preferably, the mobile station further includes:

a second receiving unit, configured to receive a positioning service activating request message over the control channel; and a response unit, configured to enable a location information uploading function and return an activating response message, after the positioning service activating request message is received by the second receiving unit.

Preferably, the second receiving unit is configured to receive the positioning service activating request message over the control channel during registration; or receive the positioning service activating request message over the control channel in the idle state.

Preferably, the second receiving unit is further configured to receive a positioning service deactivating request message over the control channel; and the response unit is further configured to disable the location information uploading function and return a deactivating response message, after the positioning service deactivating request message is received by the second receiving unit.

With the method and the device for positioning the mobile station for the cluster system and the method and the device for uploading the location information of the mobile station for the cluster system according to the embodiments of the present disclosure, the service channel which has a same frequency as and a different time slot from the control channel is configured as the location tracking data service channel for transmitting the location information of the mobile station. Therefore, the location tracking data service channel may be shared by different mobile stations by way of time division multiplexing, pull-up opportunities of location information of different terminals may be arranged properly, and utilization rate of the system resource and bearer capacity of location tracking of the mobile station are improved. Since the location tracking data service channel adopts the same frequency as the control channel, the mobile station can monitor both the control channel and the location tracking data service channel in the idle state of the mobile station without frequency switching. Accordingly, time and additional power consumption due to frequency switching are saved, and efficiency for uploading the location information is improved.

DETAILED DESCRIPTION

Compared with a public mobile communication network, a cluster system has many disadvantages in view of, for example, channel resource and data bearing capability. A method for GPS information transmission with high bearing capability by using a limited channel resource of the cluster system is of great importance to GPS application in a private network. However, current methods in the industry have problems in view of, for example, efficiency, flexibility and bearer capacity, which directly limits application of GPS in the private network.

In view of above, for a TDMA (Time Division Multiple Access) cluster system, a method and a device for positioning a mobile station for the cluster system are provided according to embodiments of the present disclosure in one aspect, and a method and a device for uploading location information of a mobile station for the cluster system are provided according to embodiments of the present disclosure in another aspect of the disclosure. In the methods and devices, the service channel which has a same frequency as and a different time slot from the control channel is configured as the location tracking data service channel for transmitting the location information of the mobile station. Therefore, the location tracking data service channel may be shared by different mobile stations by way of time division multiplexing.

At the side of the system, a location information uploading function of the mobile station on which location tracking is to be performed is activated over the control channel, a location information request message is sent to the mobile station over a location tracking data service channel, and a location information reply message sent by the mobile station is received over the location tracking data service channel, where the location information of the mobile station is carried in the location information reply message.

At the side of the mobile station, the mobile station monitors both the control channel and the location tracking data service channel in an idle state of the mobile station after the location information uploading function of the mobile station is activated, and sends, over the location tracking data service channel, a location information reply message upon reception of a location information request message over the control channel, where the location information of the mobile station is carried in the location information reply message.

Figure 1:
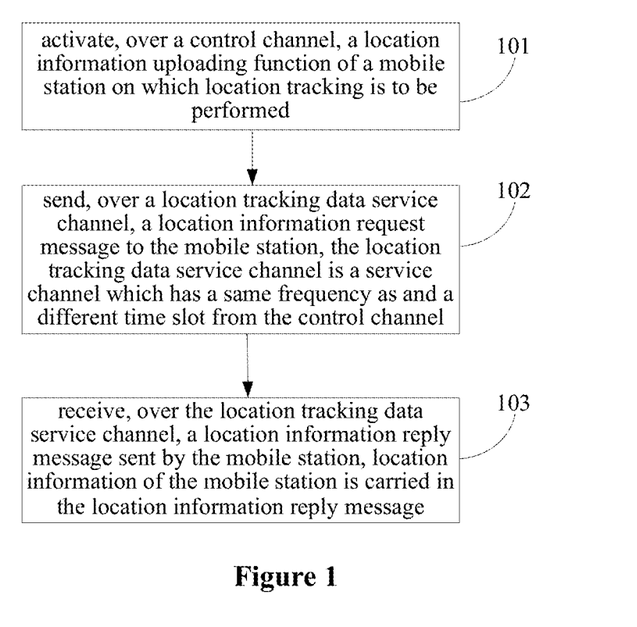
FIG. 1 is a flow chart of a method for positioning a mobile station for a cluster system according to an embodiment of the present disclosure.

As shown in FIG. 1, which is a flow chart of a method for positioning a mobile station for a cluster system according to an embodiment of the present disclosure, the method includes the following steps 101 to 103.

In step 101, a location information uploading function of a mobile station on which location tracking is to be performed is activated over a control channel.

A specific process of step 101 will be described in detail below.

In step 102, a location information request message is sent to the mobile station over a location tracking data service channel, where the location tracking data service channel is a service channel which has a frequency as and a different time slot from the control channel.

In step 103, a location information reply message sent by the mobile station is received over the location tracking data service channel, where location information of the mobile station is carried in the location information reply message.

The mobile station can monitor both the control channel and the location tracking data service channel in the idle of the mobile station since the location tracking data service channel adopts the same frequency as the control channel. The mobile station may upload its location information to the cluster system via the location information reply message after monitoring the location information request message over the location tracking data service channel.

Therefore, the cluster system may determine current location of the mobile station according to the location information of the mobile station.

It should be noted that, the above-described mobile station refers to a mobile station having a GPS positioning function, and the above-described location information of the mobile station carried in the location information reply message refers to the location information obtained by the mobile station by way of GPS positioning.

Considering mobility of the mobile station, a location information acquiring frequency for the mobile station may be set in order to track the mobile station in a real time manner. In this case, the location information request message may be sent to the mobile station over the location tracking data service channel at the location information acquiring frequency. That is, real-time tracking for the mobile station can be implemented by repeating the above-described steps 102 to 104. For example, taking a DMR cluster system using the embodiment of the present disclosure as an example, each base station may support an acquiring capacity of the location information of the mobile station at most 1000 times per minute. Acquiring the location information of at most 1000 mobile stations is supported in a case that the location information of the mobile station is acquired at a frequency of once per minute; acquiring the location information of at most 2000 mobile stations is supported in a case that the location information of the mobile station is acquired at a frequency of once per two minutes. In practice, more mobile stations can be provided with the positioning tracking service by adjusting the location information acquiring frequency.

The above-described location information acquiring frequency may also not be set, and the location information request message is sent to the mobile station over the location tracking data service channel only when necessary. That is, the system may check irregularly the current location of the mobile station, which is not limited in the embodiment of the present disclosure.

As can be seen, with the method for positioning the mobile station for the cluster system according to the embodiment of the present disclosure, the service channel which has a same frequency as and a different time slot from the control channel is configured as the location tracking data service channel for transmitting the location information of the mobile station. Therefore, the location tracking data service channel may be shared by different mobile stations by way of time division multiplexing, pull-up opportunities of the location information of different terminals may be arranged properly, and utilization rate of the system resource and bearer capacity of location tracking of the mobile station are improved.

In an embodiment of the present disclosure, in the cluster system, the base station may make the mobile station on which location tracking is to be performed enable its location information uploading function by using an activating process. Similarly, in a case that the mobile station does not need to upload the location information, the base station may make the mobile station disable its location information uploading function by using a deactivating process.

Figure 2:
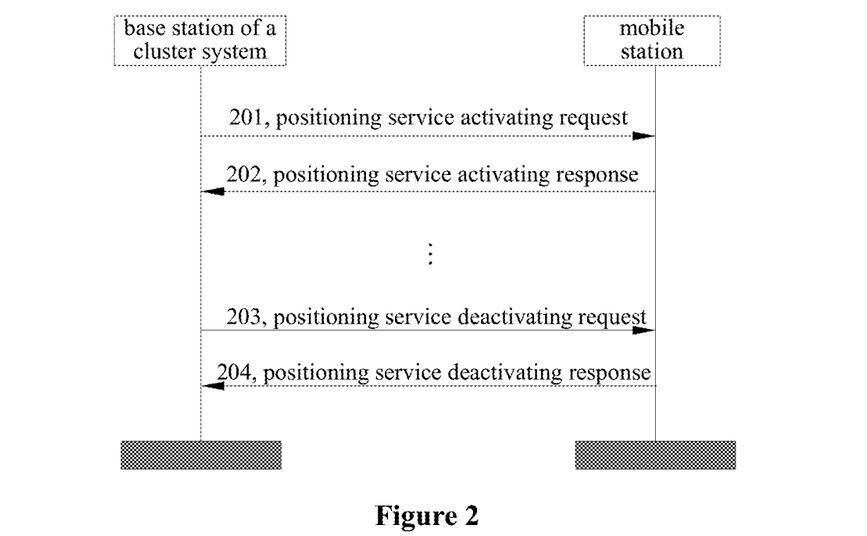
FIG. 2 is a schematic diagram of a flow of activating and deactivating a location information uploading function of a mobile station according to an embodiment of the present disclosure.

As shown in FIG. 2, which is a flow of activating and deactivating a location information uploading function of a mobile station according to an embodiment of the present disclosure, the flow includes steps 201 to 204.

In step 201, the base station of the cluster system sends, over the control channel, a positioning service activating request message to the mobile station.

It should be noted that, the above-described positioning service activating request message may be sent during registration of the mobile station, or may be sent when the mobile station is in an idle state, which is not limited in the embodiment of the present disclosure.

Additionally, there are two modes in the TDMA cluster system, i.e., two time slots and four time slots. Specifically, the TDMA cluster system divides one physical wireless channel into multiple individual logical channels by way of time slicing, and one logical channel can be identified uniquely based on a frequency number and a time slot number of the wireless channel. The cluster system uses one logical channel as the control channel. In the TDMA cluster system of two time slots, one wireless channel is divided into two logical channels, thus only one logical channel having a same frequency as and a different time slot from the control channel may be used as the location tracking data service channel. Accordingly, in the TDMA cluster system of two time slots, the system may not notify the mobile station of the time slot used by the location tracking data service channel. In the TDMA cluster system of four time slots, one wireless channel is divided into four logical channels, thus three logical channels having a same frequency as and a different time slot from the control channel may be used as the location tracking data service channel. Accordingly, in the TDMA cluster system of four time slots, information for indicating the time slot used by the location tracking data service channel may be carried in the above-described positioning service activating request message, so that the mobile station sends the location information reply message in the indicated time slot.

In step 202, the mobile station enables the location information uploading function and sends a positioning service activating response message over the control channel upon reception of the positioning service activating request message, so that the base station of the cluster system determines that the location information uploading function of the mobile station is activated according to the received positioning service activating response message.

In step 203, the base station of the cluster system sends a positioning service deactivating request message to the mobile station over the control channel.

In step 202, the mobile station disables the location information uploading function and sends a positioning service deactivating response message over the control channel upon reception of the positioning service deactivating request message, so that the base station of the cluster system determines that the location information uploading function of the mobile station is deactivated according to the received positioning service deactivating response message.

It should be noted that, in practice, between the above-described step 202 and step 203, steps 102 to 104 as shown in FIG. 1 may be performed repeatedly at the above-mentioned location information acquiring frequency for the mobile station, to implement real-time tracking for the mobile station.

In practice, a positioning service subscriber having authority, such as a mobile station in administration level in the cluster system, may subscribe location information of other mobile stations in the system. The base station of the cluster system requests the location information from the mobile station, and sends the obtained location information of the mobile station to the positioning service subscriber.

Figure 3:
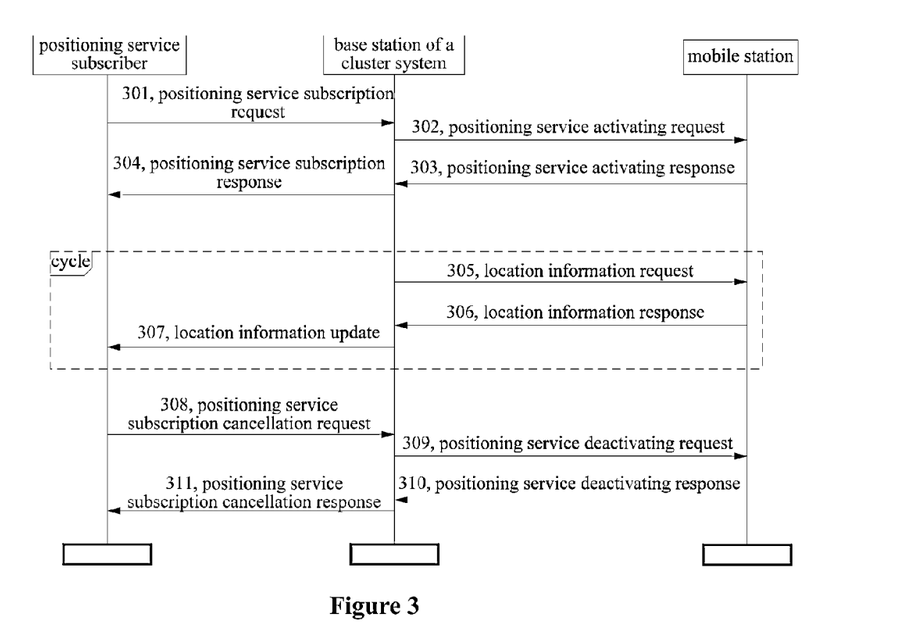
FIG. 3 is a flow chart of positioning service subscription according to an embodiment of the present disclosure.

As shown in FIG. 3, which is a flow chart of positioning service subscription according to an embodiment of the present disclosure, the positioning service subscription includes the following steps 301 to 311.

In step 301, the positioning service subscriber sends a positioning service subscription request message to the base station of the cluster system.

In step 302, the base station of the cluster system sends the positioning service activating request message to the mobile station over the control channel upon reception of the positioning service subscription request message sent by the positioning service subscriber.

In step 303, the mobile station enables the location information uploading function and sends the positioning service activating response message over the control channel upon reception of the positioning service activating request message.

In step 304, the base station of the cluster system sends a positioning service subscription response message to the positioning service subscriber upon reception of the positioning service activating response message.

In step 305, the base station of the cluster system sends the location information request message to the mobile station over the location tracking data service channel, to request the mobile station to upload current location information of the mobile station.

In step 306, the mobile station transmits the location information which is obtained by GPS positioning to the base station of the cluster system through the location information response message sent over the location tracking data service channel, upon reception of the location information request message.

In step 307, the base station of the cluster system extracts the location information from the location information response message and then sends the location information to the positioning service subscriber through a location information update message upon reception of the location information response massage, so that the positioning service subscriber determines current location of the mobile station according to the received location information update message.

It should be noted that, the process of the above-described steps 305 to 307 may be a cycle and repeated process. For example, the base station of the cluster system may sends the location information request message to the mobile station at a certain frequency, or sends the location information request message to the mobile station at some fixed time points, which is not limited in the embodiment of the present disclosure.

In step 308, the positioning service subscriber sends a positioning service subscription cancellation request message to the base station of the cluster system in a case that the positioning service subscriber no longer needs to track the mobile station.

In step 309, the base station of the cluster system sends a positioning service deactivating request message to the mobile station over the control channel upon reception of the positioning service subscription cancellation request message sent by the positioning service subscriber.

In step 310, the mobile station disables the location information uploading function and sends a positioning service deactivating response message over the control channel upon reception of the positioning service deactivating request message.

In step 311, the base station of the cluster system sends a positioning service subscription cancellation response message to the positioning service subscriber upon reception of the positioning service deactivating response message.

According to the above-described flow, the positioning service subscriber having authority may know the track of each mobile station in the cluster system in a timely manner. Moreover, in a case that multiple mobile stations need to be tracked in the same time, the base station of the cluster system may specify different time slots used by the location tracking data service channel for different mobile stations according to a certain rule. Accordingly, identity information of the mobile station may not be identified when the mobile station uploads its location information. The base station of the cluster system can know the mobile station corresponding to the obtained location information according to the correspondence between the time slot and the mobile station. Therefore, resource overhead of uplink time slots is further saved, and an uplink message may carry more location information.

Figure 4:
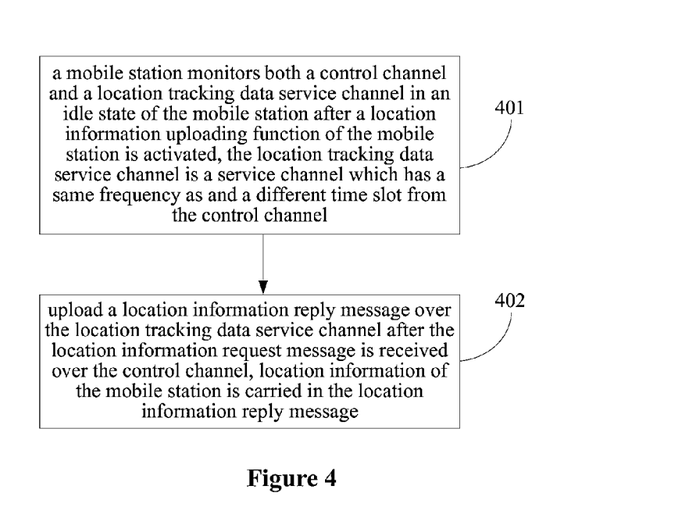
FIG. 4 is a flow chart of a method for uploading location information of a mobile station for a cluster system according to an embodiment of the present disclosure.

Correspondingly, a method for uploading location information of a mobile station for a cluster system is further provided according to an embodiment of the present disclosure. As shown in FIG. 4, which is a flow chart of this method, the method includes the following steps 401 to 402.

In step 401, the mobile station monitors both a control channel and a location tracking data service channel in an idle state of the mobile station after a location information uploading function of the mobile station is activated, where the location tracking data service channel is a service channel which has a same frequency as the control channel and a different time slot from the control channel.

In step 402, after the location information request message is received over the control channel, a location information reply message is sent over the location tracking data service channel, where the location information of the mobile station is carried in the location information reply message.

The process of activating the location information uploading function of the mobile station may refer to the flow as shown in FIG. 2 above, that is, the mobile station receives a positioning service activating request message over the control channel, enables the location information uploading function and returns an activating response message. Specifically, the mobile station may receive the positioning service activating request message over the control channel during registration of the mobile station; or the mobile station may receive the positioning service activating request message over the control channel when the mobile station is in an idle state.

As mentioned above, there are two modes in the TDMA cluster system, i.e., two time slots and four time slots. The location tracking data service channel is a service channel which has a same frequency as and a different time slot from the control channel. Therefore, in the TDMA cluster system of two time slots, the system may not indicate the time slot used by the location tracking data service channel to the mobile station. However, in the TDMA cluster system of four time slots, information for indicating the time slot used by the location tracking data service channel may be carried in the positioning service activating request message since three logic channels having a same frequency as and a different time slot from the control channel may be used as the location tracking data service channel. The mobile station uploads the location information reply message in the indicated time slot. That is, the time slot indicated by the information is occupied by the location tracking data service channel.

According to the embodiment of the present disclosure, the method may further include the following steps: the mobile station receiving a positioning service deactivating request message over the control channel, disabling the location information uploading function, and returning a deactivating response message, the detailed description may refer to the flow as shown in FIG. 2 above.

With the method for uploading location information of the mobile station for the cluster system according to the embodiment of the present disclosure, the service channel which has a same frequency as and a different time slot from the control channel is used as the location tracking data service channel for transmitting the location information of the mobile station. Therefore, the mobile station may monitor both the control channel and the location tracking data service channel in the idle state of the mobile station without frequency switching. Time and additional power consumption due to frequency switching are saved, and efficiency for uploading the location information is improved.

Moreover, by activating and deactivating processes, only the mobile station which needs to upload the location information enables the location information uploading function and other mobile stations may disable this function. Therefore, power consumption due to additional encoding during control channel lockout is saved.

Figure 5:
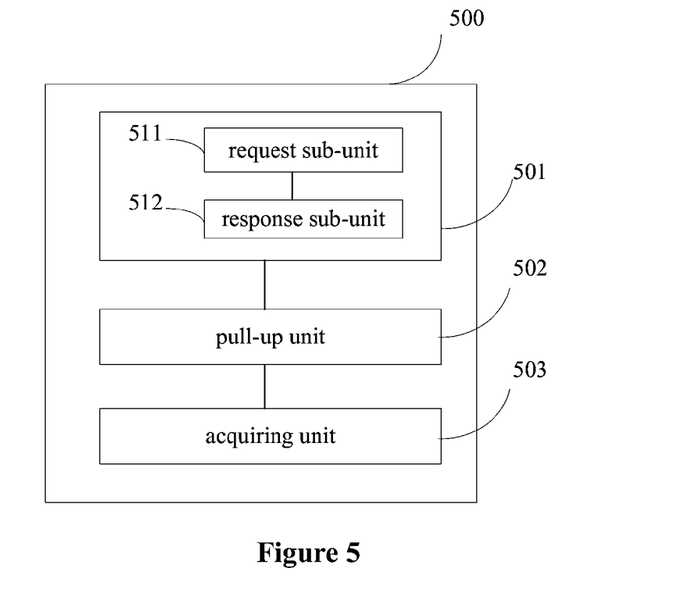
FIG. 5 is a structural block diagram of a base station of a cluster system according to an embodiment of the present disclosure.

Correspondingly, a base station of a cluster system is further provided according to an embodiment of the present disclosure, as shown in FIG. 5 which is a structural block diagram of the base station.

In this embodiment, the base station 500 includes:

an activating unit 501, configured to activate, over a control channel, a location information uploading function of a mobile station on which location tracking is to be performed;

a pull-up unit 502, configured to send a location information request message to the mobile station over a location tracking data service channel, where the location tracking data service channel is a service channel which has a same frequency as and a different time slot from the control channel; and an acquiring unit 503, configured to receive, over the location tracking data service channel, a location information reply message sent by the mobile station, where location information of the mobile station is carried in the location information reply message.

Accordingly, the base station 500 may determine current location of the mobile station according to the location information of the mobile station.

In the embodiment, the activating unit 501 may include: a request sub-unit 511 and a response sub-unit 512. The request sub-unit 511 is configured to send a positioning service activating request message to the mobile station over the control channel. For example, the request sub-unit 511 may send the positioning service activating request message to the mobile station over the control channel during registration of the mobile station; or the request sub-unit 511 may send the positioning service activating request message to the mobile station over the control channel when the mobile station is in an idle state. The response sub-unit 512 is configured to receive, over the control channel, a positioning service activating response message sent by the mobile station and determine that the location information uploading function of the mobile station is activated.

It should be noted that, information for indicating the time slot used by the location tracking data service channel may be carried in the positioning service activating request message, so that the mobile station sends the location information reply message to the base station in the indicated time slot.

It can be seen that, with the base station of the cluster system according to the embodiment of the present disclosure, the service channel which has a same frequency as and a different time slot from the control channel is configured as the location tracking data service channel for transmitting the location information of the mobile station. Therefore, the location tracking data service channel may be shared by different mobile stations by way of time division multiplexing, pull-up opportunities of location information of different terminals may be arranged properly, and utilization rate of the system resource and bearer capacity of location tracking of the mobile station are improved.

According to the embodiment, the request sub-unit 511 may be further configured to send a positioning service deactivating request message to the mobile station over the control channel. Accordingly, the response sub-unit 512 may be further configured to receive a positioning service deactivating response message sent by the mobile station over the control channel and determine that the location information uploading function of the mobile station is deactivated.

In practice, the base station of the cluster system according to the present disclosure may provide subscription service to the positioning service subscriber having authority such as the mobile station having administration level in the cluster system, so that the positioning service subscriber acquires location information of other mobile stations in the cluster system.

Figure 6:
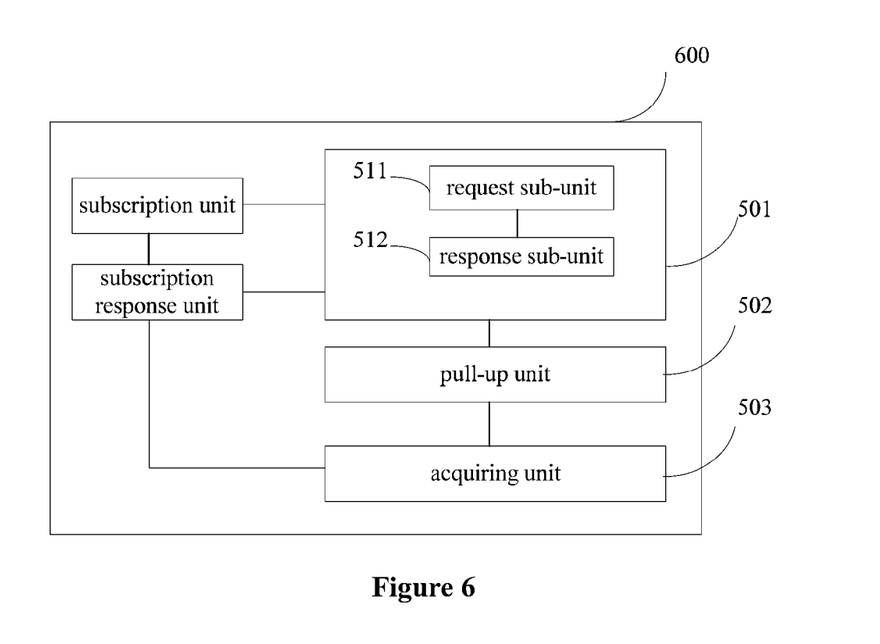
FIG. 6 is another structural block diagram of a base station of a cluster system according to an embodiment of the present disclosure.

Reference is made to FIG. 6, which is another structural block diagram of a base station of a cluster system according to an embodiment of the present disclosure.

The embodiment as shown in FIG. 6 differs from the embodiment as shown in FIG. 5 in that, the base station 600 further includes a subscription unit 601 and a subscription response unit 602.

The subscription unit 601 is configured to receive a positioning service subscription request message sent by a positioning service subscriber.

Accordingly, the request sub-unit 511 sends a positioning service activating request message to the mobile station over the control channel, after the positioning service subscription request message sent by the positioning service subscriber is received by the subscription unit 601.

The subscription response unit 602 sends a positioning service subscription reply message to the positioning service subscriber, after an activating response message sent by the mobile station is received by the response sub-unit 512. The subscription response unit 602 sends a location information update message to the positioning service subscriber, after a location information reply message sent by the mobile station is received by the acquiring unit 503. The location information of the mobile station is carried in the location information update message, so that the positioning service subscriber determines current location of the mobile station according to the location information of the mobile station.

According to the embodiment of the present disclosure, the subscription unit 601 may be further configured to receive a positioning service subscription cancellation request message sent by the positioning service subscriber.

Accordingly, the request sub-unit 511 sends a positioning service deactivating request message to the mobile station over the control channel, after the positioning service subscription cancellation request message sent by the positioning service subscriber is received by the subscription unit 601.

The subscription response unit 602 sends a positioning service subscription cancellation reply message to the positioning service subscriber, after a positioning service deactivating response message sent by the mobile station is received by the response sub-unit 512.

It should be noted that, in the embodiments as show in FIG. 5 and FIG. 6, the pull-up unit 502 may send the location information request message to the mobile station over the location tracking data service channel at a location information acquiring frequency set for the mobile station. Therefore, the acquiring unit 503 may acquire the location information of the mobile station at the frequency, and real-time tracking for the mobile station is achieved. The pull-up unit 502 may also send irregularly the location information request message to the mobile station over the location tracking data service channel, which is not limited in the embodiments of the present disclosure.

With the base station of the cluster system according to the embodiment of the present disclosure, not only the utilization rate of system resource and the bearer capacity of location tracking of the mobile station may be increased, but also the positioning service subscriber having authority may know the track of each mobile station in the cluster system in a timely manner. Moreover, in a case that multiple mobile stations need to be tracked, the base station of the cluster system may specify different time slots used by the location tracking data service channel for different mobile stations according to a certain rule. Accordingly, identity information of the mobile station may not be identified when the mobile station uploads its location information. The base station of the cluster system can know the mobile station corresponding to the obtained location information according to the correspondence between the time slot and the mobile station. Resource overhead of uplink time slots is further saved, and an uplink message may carry more location information.

Figure 7:
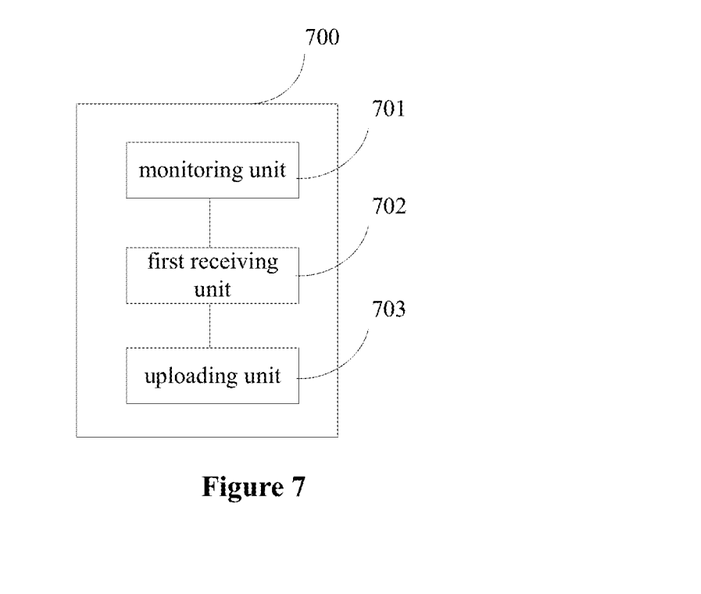
FIG. 7 is a structural block diagram of a mobile station of a cluster system according to an embodiment of the present disclosure.

Correspondingly, a mobile station of a cluster system is further provided according to an embodiment of the present disclosure, as shown in FIG. 7, which is a structural block diagram of the mobile station.

In the embodiment, the mobile station 700 includes:

a monitoring unit 701, configured to monitor, in an idle state, both a control channel and a location tracking data service channel after a location information uploading function is activated, where the location tracking data service channel is a service channel which has a same frequency as and a different time slot from the control channel;

a first receiving unit 702, configured to receive a location information request message over the control channel; and an uploading unit 703, configured to send a location information reply message over the location tracking data service channel after the location information request message is received by the first receiving unit 702, where location information of the mobile station is carried in the location information reply message.

The mobile station according to the embodiment of the present disclosure may enable actively the location information uploading function after the registration of the mobile station is completed.

In practice, activating and deactivating the location information uploading function of the mobile station may also be controlled by the system.

Figure 8:
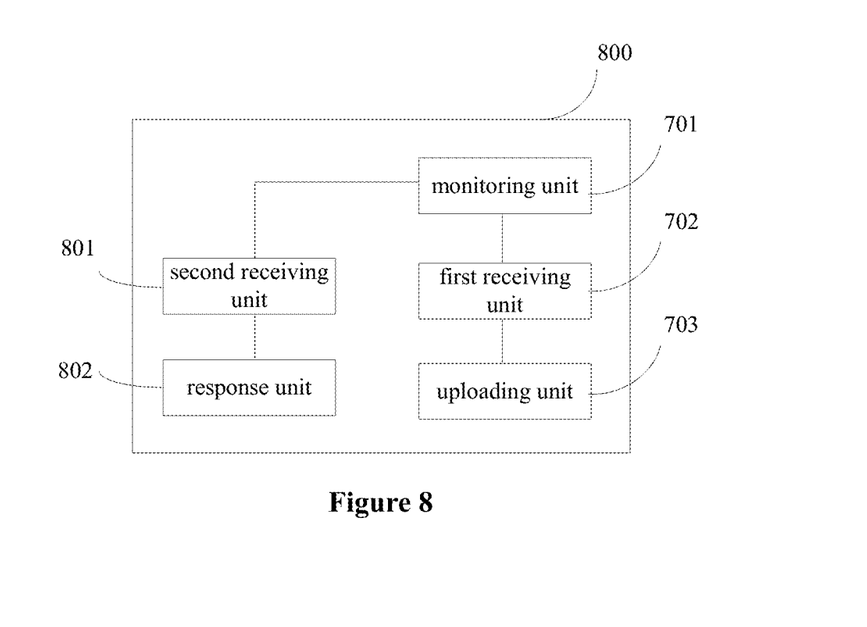
FIG. 8 is another structural block diagram of a mobile station of a cluster system according to an embodiment of the present disclosure.

Reference is made to FIG. 8, which is another structural block diagram of a mobile station of a cluster system according to an embodiment of the present disclosure.

The embodiment as shown in FIG. 8 differs the embodiment as shown in FIG. 7 in that, the mobile station 800 further includes a second receiving unit 801 and a response unit 802.

The second receiving unit 801 is configured to receive a positioning service activating request message over the control channel. Specifically, the second receiving unit 801 may receive the positioning service activating request message over the control channel during registration, or receive, in the idle state, the positioning service activating request message over the control channel.

The response unit 802 is configured to enable a location information uploading function and return an activating response message, after the positioning service activating request message is received by the second receiving unit 801.

In the embodiment, the second receiving unit 801 may further be configured to receive a positioning service deactivating request message over the control channel. Correspondingly, the response unit 802 may further be configured to disable the location information function and return a deactivating response message, after the positioning service deactivating request message is received by the second receiving unit 801.

With the method for uploading location information of the mobile station for the cluster system according to the embodiment of the present disclosure, the service channel which has a same frequency as and a different time slot from the control channel is used as the location tracking data service channel for transmitting the location information of the mobile station. Therefore, the mobile station may monitor both the control channel and the location tracking data service channel in the idle state of the mobile station without frequency switching. Time and additional power consumption due to frequency switching are saved, and efficiency for uploading the location information is improved.

Moreover, by the activating and deactivating processes, only the mobile station which needs to upload the location information enables the location information uploading function and other mobile stations may disable this function. Thus power consumption due to additional encoding during control channel lockout is saved.

Same or similar parts can be referenced to among the embodiments in the present specification, and each embodiment mainly focuses on its difference from other embodiments. In particular, for the device embodiment, the descriptions are relatively simple because the device embodiment is similar to the method embodiment, and the relevant portions may refer to the explanation of the method embodiment. The above-described device embodiments are merely illustrative, where the units explained as separate parts may be or may not be physically separate, the parts described as units may or may not be physical units, i.e., the units may be located at the same place, or be distributed on multiple network units. The purpose of the present embodiments may be implemented by selecting some or all of the modules according to the actual needs. The embodiments can be understood and implemented by those skilled in the art without any creative work. Additionally, the device in the above-described embodiment may be a handheld terminal device such as a hand-held radio equipment, or may be other communication device such as a vehicular-locating set.

Preferred embodiments of the present disclosure are disclosed above, but the present disclosure is not limited thereto. Changes without creative work and can be thought by those skilled in the art, and modification and polish made without departing from the principle of the present disclosure should fall within the scope of protection of the present disclosure.

The invention claimed is:

1. A method for positioning a mobile station for a cluster system, comprising:
    activating, over a control channel, a location information uploading function of a mobile station on which location tracking is to be performed, wherein activating, over the control channel, the location information uploading function of the mobile station on which location tracking is to be performed comprises:
        sending, over the control channel, a positioning service activating request message to the mobile station; and
        receiving, over the control channel, a positioning service activating response message sent by the mobile station, and determining that the location information uploading function of the mobile station is activated;
    sending, over a location tracking data service channel, a location information request message to the mobile station, wherein the location tracking data service channel is a service channel which has a same frequency as the control channel and a different time slot from the control channel, wherein sending, over the control channel, the positioning service activating request message to the mobile station comprises:
        sending, over the control channel, the positioning service activating request message to the mobile station upon reception of a positioning service subscription request message sent by a positioning service subscriber,
    and wherein the method further comprises:
        sending a positioning service subscription reply message to the positioning service subscriber upon reception of the activating response message sent by the mobile station;
        sending a location information update message to the positioning service subscriber upon reception of the location information reply message sent by the mobile station, wherein the location information of the mobile station is carried in the location information update message so that the positioning service subscriber determines current location of the mobile station according to the location information of the mobile station;
        sending, over the control channel, a positioning service deactivating request message to the mobile station upon reception of a positioning service subscription cancellation request message sent by the positioning service subscriber; and
        sending a positioning service subscription cancellation reply message to the positioning service subscriber upon reception of a positioning service deactivating response message sent by the mobile station and received over the control channel; and
    receiving, over the location tracking data service channel, a location information reply message sent by the mobile station, wherein location information of the mobile station is carried in the location information reply message.

2. The method according to claim 1, wherein information for indicating a time slot used by the location tracking data service channel is carried in the positioning service activating request message.

3. The method according to claim 1, wherein sending, over the control channel, the positioning service activating request message to the mobile station comprises:
    sending, over the control channel, the positioning service activating request message to the mobile station during registration of the mobile station; or
    sending, over the control channel, the positioning service activating request message to the mobile station when the mobile station is in an idle state.

4. The method according to claim 1, further comprising:
    setting a location information acquiring frequency for the mobile station,
    wherein sending, over the location tracking data service channel, the location information request message to the mobile station comprises:
    sending, over the location tracking data service channel, the location information request message to the mobile station at the location information acquiring frequency.

5. A method for uploading location information of a mobile station for a cluster system, comprising:
    monitoring, by the mobile station, both a control channel and a location tracking data service channel in an idle state of the mobile station after a location information uploading function of the mobile station is activated, wherein the location tracking data service channel is a service channel which has a same frequency as the control channel and a different time slot from the control channel;
    activating, over the control channel, a location information uploading function of a mobile station on which location tracking is to be performed, wherein activating, over the control channel, the location information uploading function of the mobile station on which location tracking is to be performed comprises:
        sending, over the control channel, a positioning service activating request message to the mobile station; and
        receiving, over the control channel, a positioning service activating response message sent by the mobile station, and determining that the location information uploading function of the mobile station is activated; and
    sending, over the location tracking data service channel, a location information reply message upon reception of a location information request message over the location tracking data service channel, wherein the location information of the mobile station is carried in the location information reply message, wherein the location tracking data service channel is a service channel which has a same frequency as the control channel and a different time slot from the control channel, wherein sending, over the control channel, the positioning service activating request message to the mobile station comprises:

sending, over the control channel, the positioning service activating request message to the mobile station upon reception of a positioning service subscription request message sent by a positioning service subscriber, and wherein the method further comprises:

sending a positioning service subscription reply message to the positioning service subscriber upon reception of the activating response message sent by the mobile station;

sending a location information update message to the positioning service subscriber upon reception of the location information reply message sent by the mobile station, wherein the location information of the mobile station is carried in the location information update message so that the positioning service subscriber determines current location of the mobile station according to the location information of the mobile station;

sending, over the control channel, a positioning service deactivating request message to the mobile station upon reception of a positioning service subscription cancellation request message sent by the positioning service subscriber; and sending a positioning service subscription cancellation reply message to the positioning service subscriber upon reception of a positioning service deactivating response message sent by the mobile station and received over the control channel.

6. The method according to claim 5, further comprising:
receiving, by the mobile station, a positioning service activating request message over the control channel; and
enabling the location information uploading function and returning an activating response message.

7. The method according to claim 6, wherein information for indicating a time slot used by the location tracking data service channel is carried in the positioning service activating request message; and
the time slot indicated by the information is occupied by the location tracking data service channel.

8. The method according to claim 6, wherein receiving, by the mobile station, the positioning service activating request message over the control channel comprises:
receiving the positioning service activating request message over the control channel during registration of the mobile station; or
receiving the positioning service activating request message over the control channel when the mobile station is in the idle state.

9. The method according to claim 6, further comprising:
receiving, by the mobile station, a positioning service deactivating request message over the control channel; and
disabling the location information uploading function and returning a deactivating response message.

10. A base station of a cluster system, comprising:
an activating unit, configured to activate, over a control channel, a location information uploading function of a mobile station on which location tracking is to be performed, wherein the activating unit comprises:
a request sub-unit, configured to send a positioning service activating request message to the mobile station over the control channel; and
a response sub-unit, configured to receive, over the control channel, a positioning service activating response message sent by the mobile station, and determine that the location information uploading function of the mobile station is activated;
a pull-up unit, configured to send a location information request message to the mobile station over a location tracking data service channel, wherein the location tracking data service channel is a service channel which has a same frequency as the control channel and a different time slot from the control channel;
an acquiring unit, configured to receive, over the location tracking data service channel, a location information reply message sent by the mobile station, wherein location information of the mobile station is carried in the location information reply message; and
a subscription unit and a subscription response unit, wherein the subscription unit is configured to receive a positioning service subscription request message sent by a positioning service subscriber;
the request sub-unit is configured to send the positioning service activating request message to the mobile station over the control channel, after the positioning service subscription request message sent by the positioning service subscriber is received by the subscription unit;
the subscription response unit is configured to send a positioning service subscription reply message to the positioning service subscriber after the activating response message sent by the mobile station is received by the response sub-unit; and send a location information update message to the positioning service subscriber after a location information reply message sent by the mobile station is received by the acquiring unit, wherein the location information of the mobile station is carried in the location information update message so that the positioning service subscriber determines current location of the mobile station according to the location information of the mobile station;
the subscription unit is further configured to receive a positioning service subscription cancellation request message sent by the positioning service subscriber;
the request sub-unit is further configured to send a positioning service deactivating request message to the mobile station over the control channel, after the positioning service subscription cancellation request message sent by the positioning service subscriber is received by the subscription unit; and
the subscription response unit is further configured to send a positioning service subscription cancellation reply message to the positioning service subscriber, after a positioning service deactivating response message sent by the mobile station is received by the response sub-unit.

11. The base station according to claim 10, wherein the request sub-unit is configured to send the positioning service activating request message to the mobile station over the control channel during registration of the mobile station; or send the positioning service activating request message to the mobile station over the control channel when the mobile station is in an idle state.

12. The base station according to claim 10, wherein the pull-up unit is configured to send, over the location tracking data service channel, the location information request message to the mobile station at a location information acquiring frequency set for the mobile station.

13. A mobile station of a cluster system, comprising:
   a monitoring unit, configured to monitor, in an idle state, both a control channel and a location tracking data service channel after a location information uploading function is activated, wherein the location tracking data service channel is a service channel which has a same frequency as the control channel and a different time slot from the control channel;
   an activating unit, configured to activate, over a control channel, a location information uploading function of a mobile station on which location tracking is to be performed, wherein the activating unit comprises:
      a request sub-unit, configured to send a positioning service activating request message to the mobile station over the control channel; and
      a response sub-unit, configured to receive, over the control channel, a positioning service activating response message sent by the mobile station, and determine that the location information uploading function of the mobile station is activated;
   a first receiving unit, configured to receive a location information request message over the location tracking data service channel;
   an uploading unit, configured to send a location information reply message over the location tracking data service channel after the location information request message is received by the first receiving unit, wherein location information of the mobile station is carried in the location information reply message; and
   a subscription unit and a subscription response unit, wherein the subscription unit is configured to receive a positioning service subscription request message sent by a positioning service subscriber;
   the request sub-unit is configured to send the positioning service activating request message to the mobile station over the control channel, after the positioning service subscription request message sent by the positioning service subscriber is received by the subscription unit;
   the subscription response unit is configured to send a positioning service subscription reply message to the positioning service subscriber after the activating response message sent by the mobile station is received by the response sub-unit; and send a location information update message to the positioning service subscriber after a location information reply message sent by the mobile station is received by the acquiring unit, wherein the location information of the mobile station is carried in the location information update message so that the positioning service subscriber determines current location of the mobile station according to the location information of the mobile station;
   the subscription unit is further configured to receive a positioning service subscription cancellation request message sent by the positioning service subscriber;
   the request sub-unit is further configured to send a positioning service deactivating request message to the mobile station over the control channel, after the positioning service subscription cancellation request message sent by the positioning service subscriber is received by the subscription unit; and
   the subscription response unit is further configured to send a positioning service subscription cancellation reply message to the positioning service subscriber, after a positioning service deactivating response message sent by the mobile station is received by the response sub-unit.

14. The mobile station according to claim 13, further comprising:
   a second receiving unit, configured to receive a positioning service activating request message over the control channel; and
   a response unit, configured to enable the location information uploading function and return an activating response message, after the positioning service activating request message is received by the second receiving unit.

15. The mobile station according to claim 14, wherein the second receiving unit is configured to receive the positioning service activating request message over the control channel during registration; or receive the positioning service activating request message over the control channel in the idle state.

16. The mobile station according to claim 14, wherein the second receiving unit is further configured to receive a positioning service deactivating request message over the control channel; and
   the response unit is further configured to disable the location information uploading function and return a deactivating response message, after the positioning service deactivating request message is received by the second receiving unit.

* * * * *